United States Patent [19]

Crispin et al.

[11] Patent Number: 5,440,913
[45] Date of Patent: Aug. 15, 1995

[54] ELECTRONIC DEVICE FOR SAFEGUARDING OCCUPANTS OF A VEHICLE AND METHOD FOR TESTING THE SAME

[75] Inventors: Norbert Crispin, Markgroeningen; Michael Henne, Ditzingen-Schoeckingen; Bernhard Mattes, Sachsenheim; Hartmut Schumacher, Freiberg, all of Germany

[73] Assignee: Robert Bosch GmbH, Germany

[21] Appl. No.: 126,948

[22] Filed: Sep. 27, 1993

[30] Foreign Application Priority Data

Sep. 25, 1992 [DE] Germany ............... 42 32 108.5
Jan. 28, 1993 [DE] Germany ............... 43 02 399.1

[51] Int. Cl.⁶ .............................................. B60R 21/32
[52] U.S. Cl. ........................................ 73/1 D; 180/282; 280/735; 307/10.1; 340/436
[58] Field of Search .................. 73/10; 180/271, 274, 180/282; 280/734, 735; 340/436; 307/10.1

[56] References Cited

U.S. PATENT DOCUMENTS

| | | | |
|---|---|---|---|
| 3,870,894 | 3/1975 | Brede et al. | 180/274 |
| 3,993,363 | 11/1976 | Skoyles et al. | 303/110 |
| 4,020,453 | 4/1977 | Spies et al. | 340/52 H |
| 4,117,730 | 10/1978 | Spies et al. | 73/517 R |
| 4,475,511 | 10/1984 | Johnson et al. | 123/436 |
| 4,672,849 | 6/1987 | Hoshino | 73/579 |
| 4,835,513 | 5/1989 | McCurdy et al. | 307/10.1 |
| 4,873,452 | 10/1989 | Morota et al. | 307/10.1 |
| 4,950,915 | 8/1990 | Spies et al. | 307/10.1 |
| 4,975,850 | 12/1990 | Diller | 307/10.1 |
| 5,037,129 | 8/1991 | Fritz et al. | 280/734 |
| 5,040,118 | 8/1991 | Diller | 307/10.1 |
| 5,083,276 | 1/1992 | Okano et al. | 307/10.1 |
| 5,086,862 | 2/1992 | Gaher et al. | 180/132 |
| 5,101,115 | 3/1992 | Nitschke et al. | 307/10.1 |
| 5,122,954 | 6/1992 | Okano | 280/735 |
| 5,223,086 | 6/1993 | Terada et al. | 73/517 R |
| 5,225,985 | 7/1993 | Okano | 280/735 |
| 5,262,949 | 11/1993 | Okano et al. | 280/735 |
| 5,285,188 | 2/1994 | Yoshida | 280/735 |
| 5,339,242 | 8/1994 | Reid et al. | 307/10.1 |

FOREIGN PATENT DOCUMENTS

| | | | |
|---|---|---|---|
| 327853 | 8/1989 | European Pat. Off. | 280/735 |
| 2454424 | 5/1976 | Germany . | |
| 2612215 | 9/1977 | Germany . | |
| 3920091 | 10/1990 | Germany . | |
| 121951 | 5/1991 | Japan | 280/735 |
| 191149 | 7/1992 | Japan | 280/735 |

Primary Examiner—Hezron E. Williams
Assistant Examiner—Daniel S. Larkin
Attorney, Agent, or Firm—Kenyon & Kenyon

[57] ABSTRACT

An electronic device, in particular a system for safeguarding vehicle occupants, comprises at least two acceleration-sensitive sensors arrangements. To test the readiness for operation of the sensor arrangements, output signals from the sensor arrangements are compared. Output signals, which occur as the result of accelerations arising during normal operation of the vehicle, are also drawn upon when the comparison is made.

27 Claims, 12 Drawing Sheets

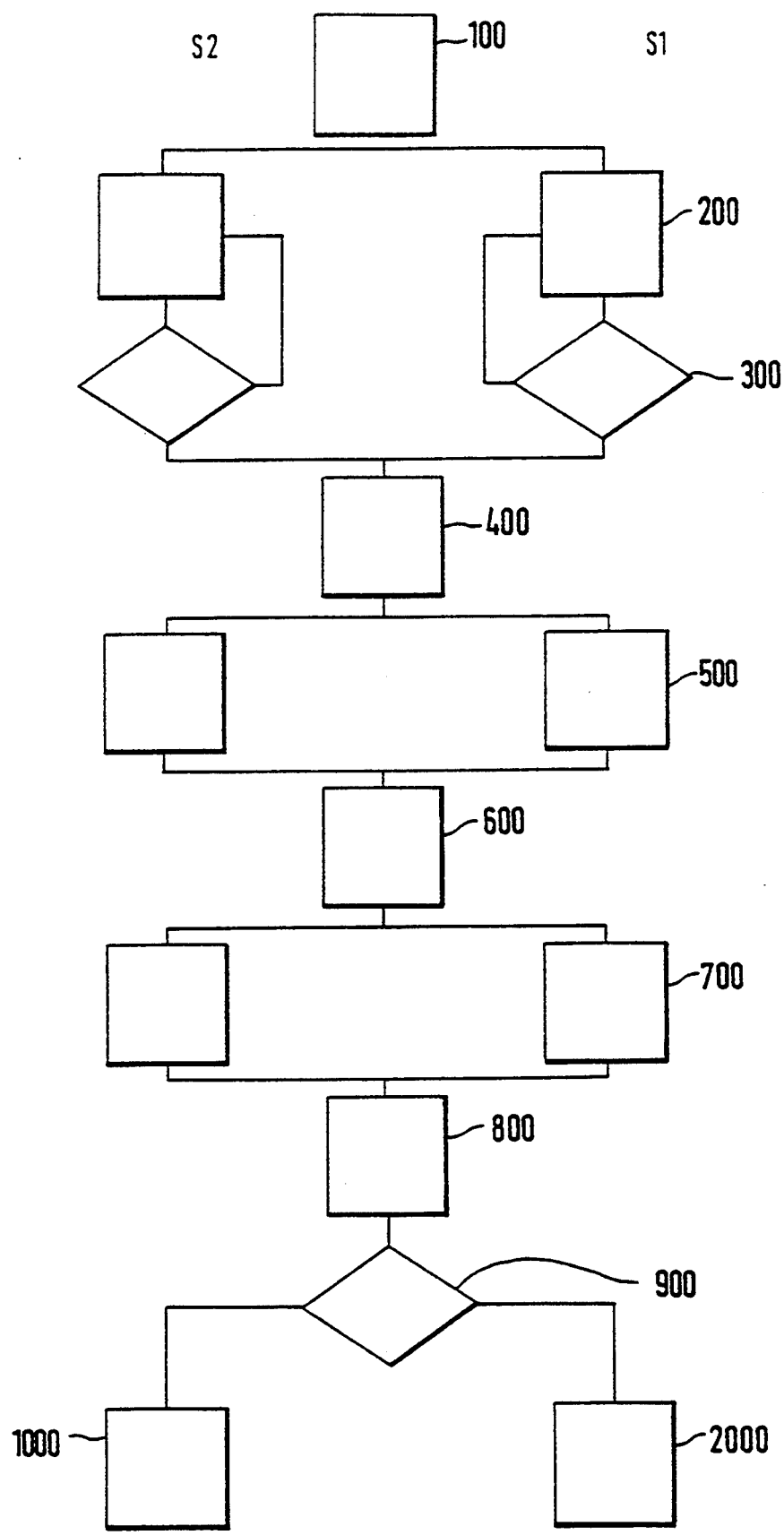

ELECTRONIC DEVICE FOR SAFEGUARDING OCCUPANTS OF A VEHICLE AND METHOD FOR TESTING THE SAME

FIELD OF THE INVENTION

The present invention relates to an electronic device, in particular an electronic device for safeguarding vehicle occupants, and a method for testing the same.

BACKGROUND OF THE INVENTION

Known electronic devices for safeguarding vehicle occupants, in particular motor-vehicle occupants, typically comprise acceleration-sensitive sensors, which register the accelerations acting on the vehicle and, when high acceleration values indicate danger, cause safety devices provided for vehicle occupants, such as belt tighteners and/or airbags, to be tripped in time. Dangerous, high acceleration values occur, in particular, when a vehicle experiences a collision or when it crashes against a stationary object.

An exceptionally high operational reliability is required of electronic devices of the above-mentioned type, which are critical to safety. In an emergency, these devices are entrusted with passengers' lives. This high degree of operational reliability can be virtually guaranteed only when all the components of the electronic device are able to be tested in at least regular intervals.

The acceleration-sensitive sensors, which are not able to be easily tested during the normal driving state of a vehicle without entailing considerable expenditure, present a special problem in this case. A principal reason for this is the fact that during normal vehicle driving states, the acceleration curve shapes that are characteristic of an accident do not occur as a function of time; nor do high amplitude values occur. It may be that, in principle, the acceleration-sensitive sensors can be tested when the vehicle is in a state of non-readiness. To this end, the acceleration-sensitive sensors must be disassembled, for example, and subjected to an acceleration test on a test stand. As an alternative, the vehicle could be exposed, with the acceleration-sensitive sensors installed, to realistic acceleration values in a simulated crash test. Even when such costly testing methods find the acceleration-sensitive sensors to be usable, there is no guarantee that the operability will be sustained over a long period during a normal driving state.

U.S. Pat. No. 4,873,452 describes a testable electronic device having a piezoelectric, acceleration-sensitive sensor. An electric testing pulse is applied to the sensor for diagnostic purposes. The piezoelectric sensor reacts to this electric testing pulse by emitting an output signal capable of being analyzed by an evaluating circuit. Apart from the fact that the additional testing device is very expensive and results in a very costly electronic device, it is not possible to test the sensor using this known testing method in a way that will correspond to actual service conditions. One may be able to test the electrical properties of the sensor; however, one cannot test to see if the sensor reacts in the desired manner to a mechanical action of force resulting from an applied acceleration. In the same way, the mechanical coupling of the acceleration-sensitive sensor to the vehicle cannot be tested.

An acceleration-sensitive sensor having a testing device is described in U.S. Pat. No. 4,950,915. The testing device comprises an acoustic source, which applies acoustic waves to the acceleration-sensitive sensor for testing purposes. The acoustic waves are injected into the acceleration-sensitive sensor, on the one hand, indirectly, on the other hand, directly through a housing surrounding the sensor and the acoustic source. In this manner, besides fundamentally testing the transducing properties of the acceleration-sensitive sensor, one is supposedly also able to test the mounting of the sensor in the vehicle. Apart from the fact that the additional acoustic source and its trigger circuit make the known electronic device more intricate and expensive, there is an elevated risk, due to the greater number of components, of errors also occurring in the testing device.

Furthermore, German Provisional Patent No. 24 54 424 discloses that in the case of one safety device for vehicle occupants, acceleration values that fall below a specifiable minimum value are not evaluated. Normal shaking of the vehicle due to road conditions, for example, also falls below this value. As a rule, this is justified by the fact that such low acceleration values do not present any danger to the vehicle occupants. Therefore, output signals from the acceleration-sensitive sensors, which can be attributed to such low acceleration values, are suppressed. German No. C2-26 12 215 describes, for example, that acceleration values of safety devices are only evaluated above a limiting value of 4 g. Accelerations below this value are disregarded.

Finally, German No. A1-39 20 091.4 describes a vehicle occupant safety device comprising two acceleration-sensitive sensors, which compares the sensor output signals for purposes of testing the operability of the sensors. The disclosed device makes use of the fact that high acceleration values occur temporarily in normal driving states as well. These values are not accident-specific, but rather can be attributed to the heavy stresses that the vehicle body and the sensors are subjected to, for example, when the vehicle is driven over potholes, irregular road surfaces or the like. However, such stresses due to acceleration occur quite irregularly, so that a reliable test cannot be set up on the basis of these stresses. Furthermore, the disclosed device presupposes the application of acceleration-sensitive sensors having largely conforming output-signal characteristics. However, this necessitates a complex selection process with a comparatively low yield of sensors having conforming output-signal characteristics. Sensors selected in this manner, however, are comparatively expensive.

SUMMARY OF THE INVENTION

The present invention is directed to a device and method for safeguarding occupants of a vehicle having a plurality of operating conditions including a normal operating condition. The electronic device includes a plurality of acceleration-sensitive sensor arrangements for generating accelerations signals, and the method includes the step of evaluating acceleration signals occurring during the normal operating condition of the vehicle.

In contrast to conventional devices, the electronic device according to the present invention and the method for testing the same offer the advantage, in particular, of making it possible for the acceleration-sensitive sensors to be continually tested during a normal driving state of the vehicle, in which only comparatively low acceleration values occur. Thus, a test takes place even at acceleration values lying far below a limiting value of 4 g. In conventional electronic devices of this type, such acceleration values are generally excluded from an evaluation, because a minimum threshold value is stipulated for the acceleration. Therefore, to test the sensors, the device also does not have to rely on the evaluation of peak acceleration values that occur sporadically, for instance when potholes are driven over and/or when the vehicle body is subjected to impact stresses, or even only in connection with the occurrence of an accident. The acceleration-sensitive sensors' capacity to be tested virtually continually guarantees that errors that arise can be detected very quickly. Therefore, the solution according to the present invention makes it possible for the system safeguarding the vehicle occupants to be exceptionally safe and reliable.

BRIEF DESCRIPTION OF THE DRAWINGS

FIG. 7 shows a flow chart for a method according to the present invention.

DETAILED DESCRIPTION

Figure 1:
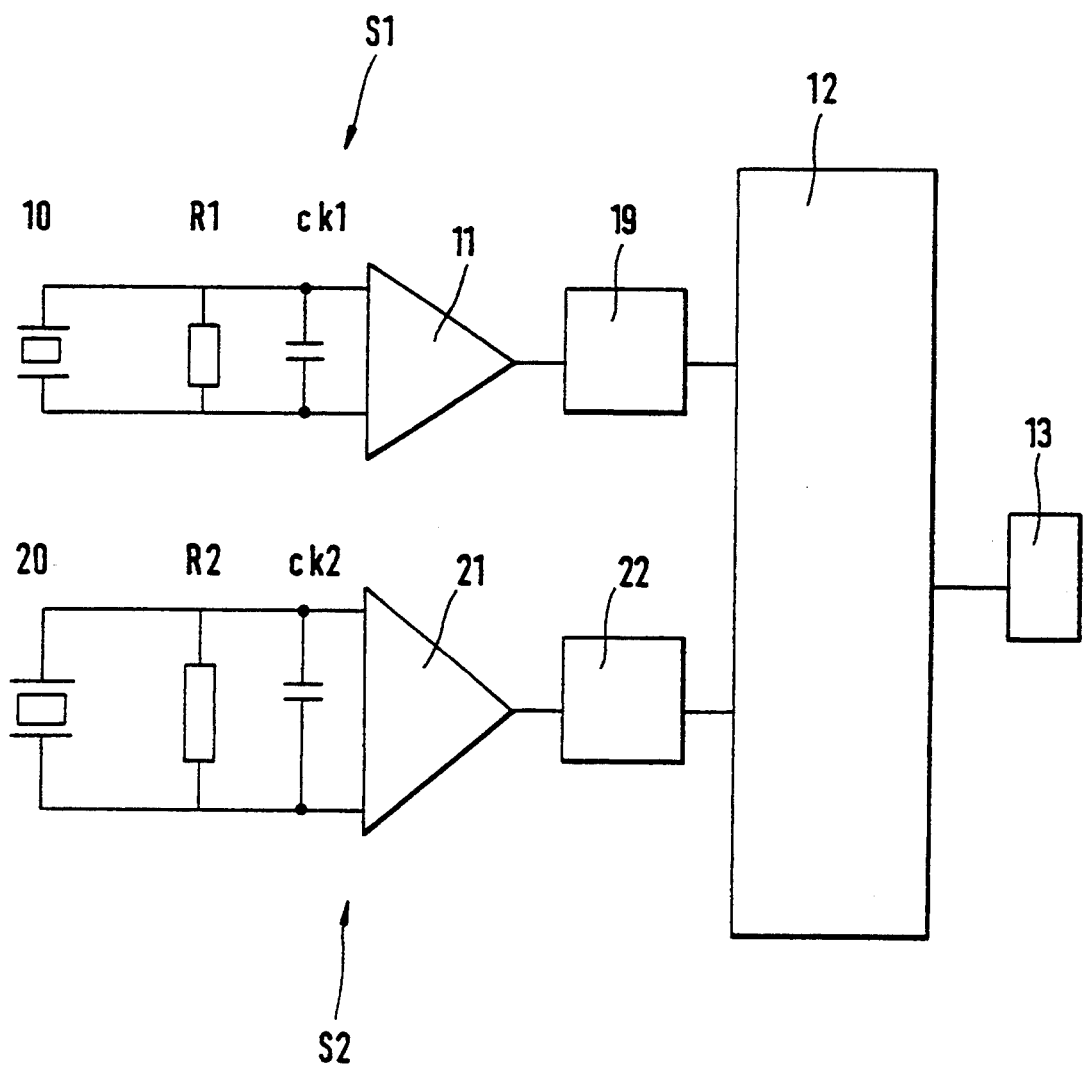
FIG. 1 shows a first block diagram of an embodiment of the electronic device according to the present invention.

The block diagram depicted in FIG. 1 illustrates an electronic device, which has two essentially identically designed sensor configurations S1 and S2. Each sensor arrangement comprises an accelerometer, in particular piezoelectric accelerometers 10, 20, a resistor-capacitor network having the resistors R1, R2 and the capacitors CK1 and CK2, as well as the amplifiers 11 and 21. The amplifiers, preferably operational amplifiers 11, 21, have input resistors Re1, Re2, for which the relation $$Re1, Re2 >> R1, R2 \quad (1)$$

applies.

The accelerometers 10, 20 have capacitance values of $C_{P1}$ and $C_{P2}$, respectively. The capacitors denoted by CK1 or CK2 are compensating capacitors for compensating for the temperature coefficient of the piezoelectric voltage constant of the accelerometers 10, 20. The resistors R1, R2 are high-resistance load resistors, which are shunted to the accelerometers 10, 20. The mentioned variables result in the following relations with respect to the time constant and the lower critical frequency of the sensor arrangements S1, S2.

Time constant of the sensor arrangement S1:

$$\tau1 = R1 \ (C_{P1} + CK1) \quad (2)$$

Time constant of the sensor arrangement S2:

$$\tau2 = R2 \ (C_{P2} + CK2) \quad (3)$$

Lower critical frequency of the sensor arrangement S1:

$$fgU1 = \frac{1}{2\pi \ \tau1}. \quad (4)$$

Lower critical frequency of the sensor arrangement S2:

$$fgU2 = \frac{1}{2\pi \ \tau2}. \quad (5)$$

Generally, in the case of acceleration-sensitive sensor arrangements S1, S2, no special demands are placed on the accuracy of the lower critical frequency for evaluating acceleration signals associated with the occurrence of accidents. The frequencies of interest lie clearly above a critical frequency of $$fgU_{TYP} = 0.6 \ Hz. \quad (6)$$

In practice, the following component values have proven to be suitable, for instance: R1, R2 approximately 200 megohm; CK1, CK2 approximately 330 microfarad; CP1, CP2 approximately 900 microfarad.

The significance of the lower critical frequency fgu of the sensor arrangements S1, S2 will be described in greater detail further below in connection with the present invention. The output terminals of the amplifiers denoted in FIG. 1 by 11 and 21 are connected to the input terminals of a processor, in particular a microprocessor 12. One output terminal of the microprocessor 12 is connected to a safety device for vehicle occupants, preferably to an airbag 13.

Figure 2:
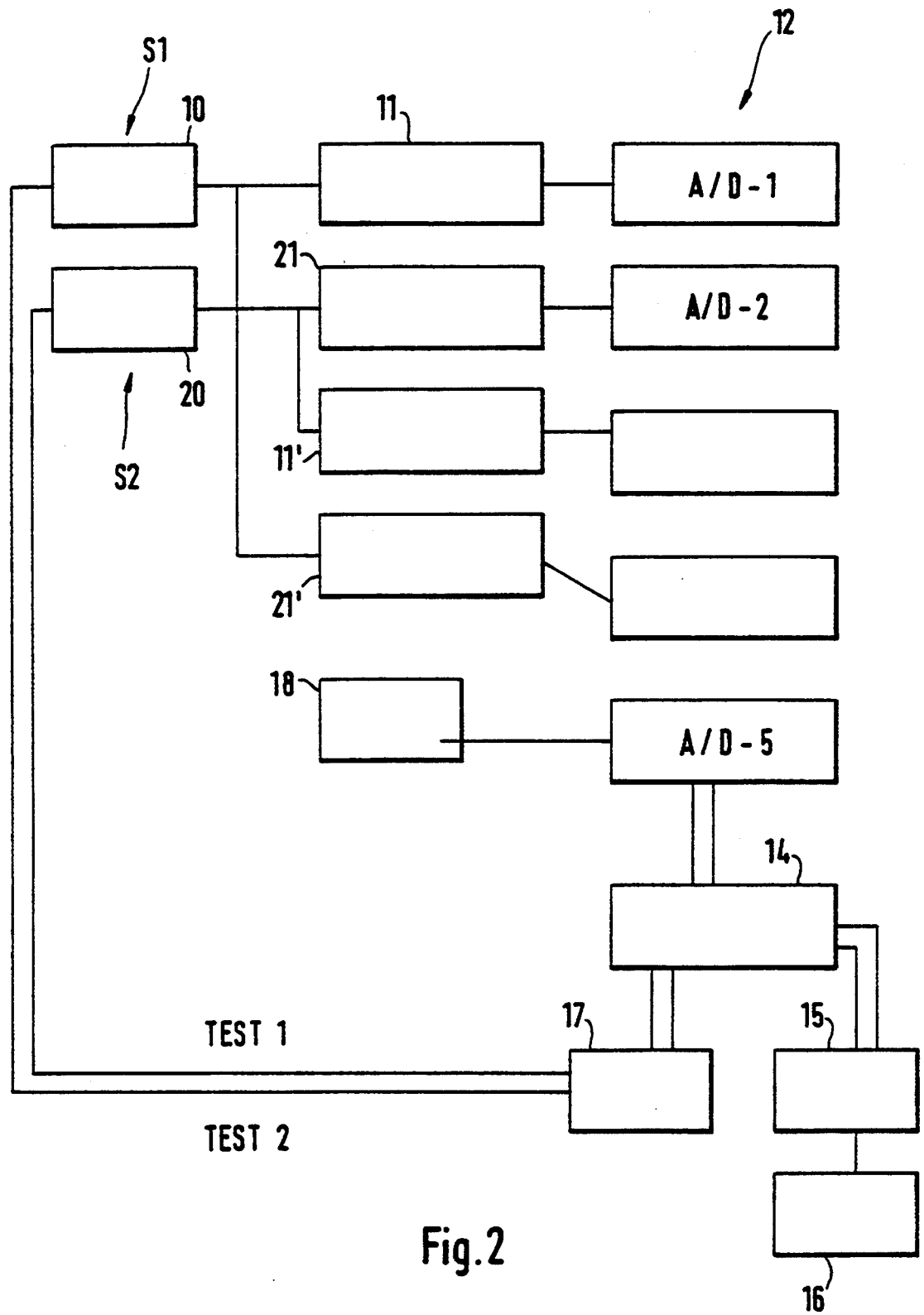
FIG. 2 shows in greater detail the first block diagram of the electronic device according to the present invention.

FIG. 2 illustrates a somewhat more detailed block diagram of the electronic device. The electronic device comprises two accelerometers 10, 20, whose output terminals are connected to an input terminal of at least one amplifier 11, 21 or 11', 21' each. The components of a resistor-capacitor network provided, in some instances, for wiring the accelerometers 10, 20 are not shown. The output terminals of the amplifiers 11, 21, 11', 21' are connected to the input terminals of the microprocessor 12 and lead, in particular, to the analog-digital converters (A/D converters) provided in the microprocessor. The analog-digital converters are denoted by A/D-1 to A/D-4. In addition, the microprocessor 12 comprises an arithmetic unit 14, a memory unit 15, an interface module 16, and an input/output module 17. Output terminals of this input/output module are linked via lines test 1, test 2 to input terminals of the sensor arrangements S1, S2 and are able to apply test signals to them. In addition, a temperature sensor 18' is provided, which is connected to the input terminal of another analog-digital converter A/D-5 within the processor.

Figure 3:
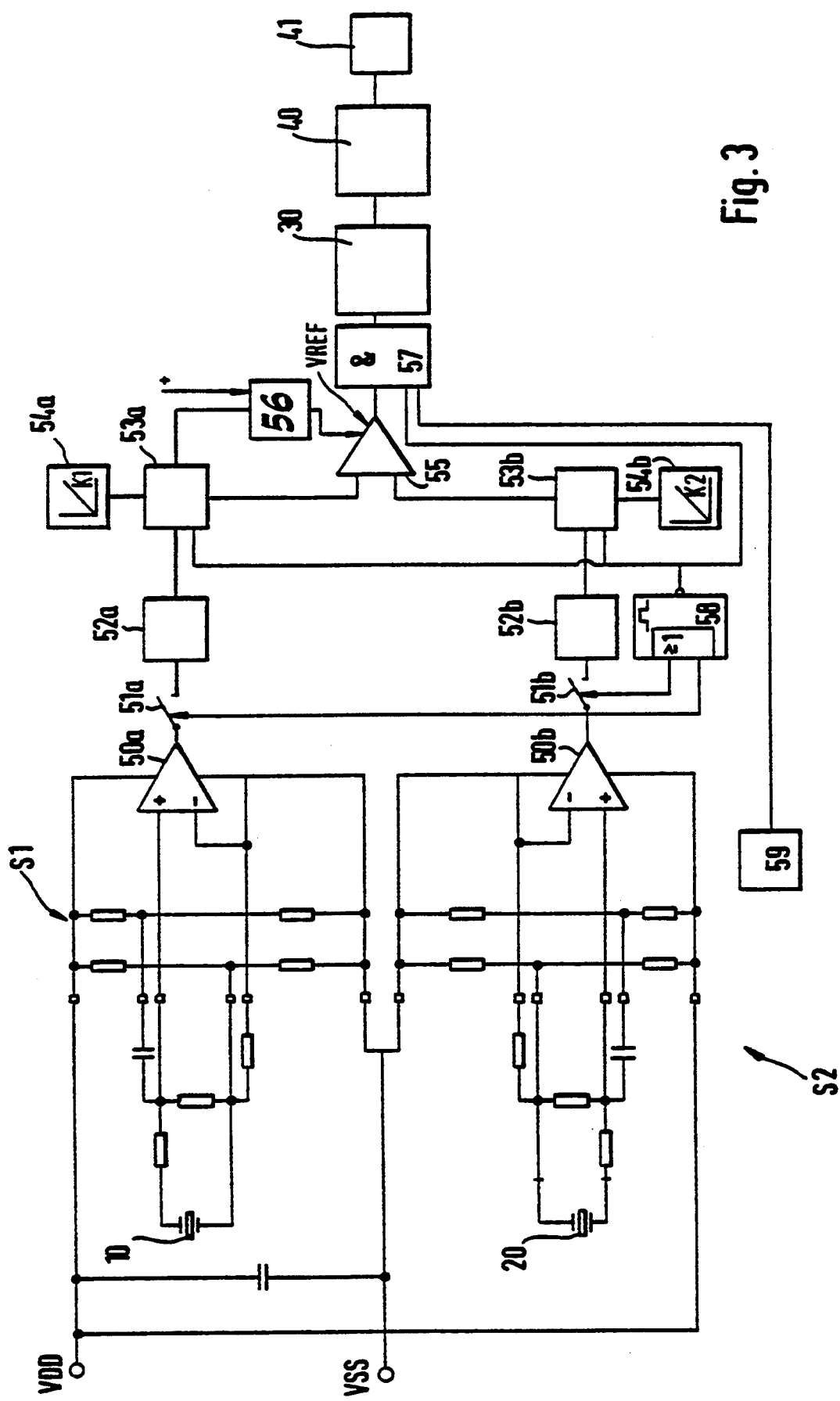
FIG. 3 shows a second block diagram of the electronic device according to the present invention.

In the block diagram of FIG. 3, accelerometers 10, 20 are linked via one resistor-capacitor network each, having elements not designated in greater detail, to input terminals of amplifiers 50a, 50b. The output terminals of the amplifiers 50a, 50b are able to be connected via circuit elements 51a, 51b to input terminals of integrator modules 52a, 52b, which integrate the output signals being applied to the output terminals of the amplifiers 50a, 50b. The circuit elements 51a, 51b are linked to a timing element 58 and are actuated by this element. The output terminals of the integrator modules 52a, 52b are connected to the input terminals of frequency-compensating devices 53a, 53b. The frequency response characteristic can be corrected with the aid of these frequency-compensating devices. For this purpose, for example, correction values K1, K2, which are linked to the output signals from the integrator modules 52a, 52b, are stored in characteristics maps 54a, 54b. The output signals from the integrator modules 52a, 52b are fed, in some instances after being compensated for frequency by means of the frequency-compensating devices 53a, 53b, to the input terminals of a differential element 55, which compares the differential value, in some instances, to a reference value VREF supplied by a reference element 56. The output terminal of the differential element 55 is connected to an input terminal of a logic element 57, whose output terminal is connected, in turn, to an evaluation circuit 30. The evaluation circuit 30, in turn, is linked to a trigger circuit 40, to which is connected an inertial restraining device for vehicle occupants, in particular an airbag 41.

Figure 4:
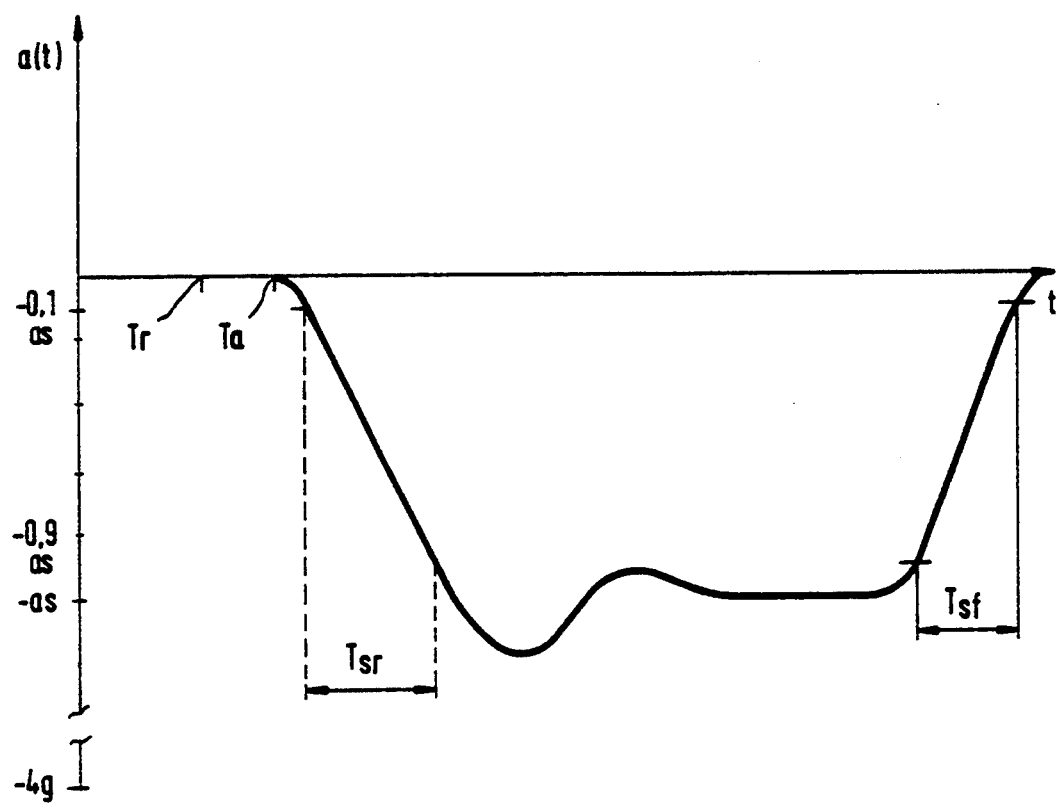
FIG. 4 shows a typical acceleration-time curve of a motor vehicle in operation.

The present invention makes use of the fact that even during normal operation of a motor vehicle, accelerations constantly occur, which can be utilized to test the electronic device comprising the sensor arrangements. Normal operation of the motor vehicle is understood to mean operating states which do not represent an accident situation. Within the course of such a normal operating state, such accelerations occur, for example, in conjunction with a braking operation, whose typical characteristic curve is illustrated by the diagram depicted in FIG. 4. This diagram represents an acceleration-time curve, in which, therefore, the acceleration a is plotted as a function of the time t. The diagram emphasizes various characteristic times and acceleration values, which have the following significance. The symbol "as" denotes the setpoint value of the desired full delay (time lag), which lies below the maximum possible delay. The symbol "Tr" denotes the reaction time a driver needs from the time when an obstacle is recognized until the brake pedal is actuated. The symbol "Ta" is the response time of the brake. The symbol "Tsr" is the braking threshold time in the rise phase, thus in the case of a braking action, that period of time which elapses, starting from the delay value 0.1 as, until the delay value 0.9 as is reached. Analogously, the braking threshold time in the drop-off phase of the braking actuation is denoted by Tsf. The braking threshold time Tsr is dependent, inter alia, upon the pedal characteristic of the vehicle. For small acceleration values on the order of magnitude of between about 0.1 to 0.2 g (g=gravitational acceleration), Tsr amounts to approximately 150 to 250 milliseconds. For larger delays in the order of magnitude of about 0.2 to 0.8 g, Tsr amounts to approximately 250 to 450 milliseconds. The delay values on the order of magnitude of between about 0.1 and 1 g occurring in the case of usual braking operations during normal operating states lie, therefore, substantially below the critical delay value of −4 g that is also plotted in the diagram. This critical delay value is provided in conventional electronic devices as the lower threshold value for evaluating acceleration values. Now, to be able to utilize such comparatively low acceleration values for purposes of testing the electronic device, in particular the sensor arrangements, certain preconditions must be met.

On the one hand, it must be possible to detect comparatively slow operations, i.e., operations for which $$fgu_{measuring\ signal} = \tfrac{1}{2}\, fgU_{sensor} \quad (7)$$

applies.

In this equation, $fgU_{measuring\ signal}$ signifies the lower critical frequency of the acceleration signal to be detected, and $fgU_{sensor}$ the lower critical frequency of the accelerometer detecting the acceleration signal.

As a further condition, it must be possible, in some instances, to consider existing large differences with respect to the lower critical frequency of the sensors being used. Furthermore, comparatively low acceleration values occurring during the normal operation of the vehicle must be able to be resolved very well. Finally, it must be possible to consider the influence of still other variables, such as temperature, on the responsivity of the sensors.

The method according to the present invention will be illustrated below in greater detail on the basis of the diagrams depicted in FIG. 5 and FIG. 6 and on the basis of the flow chart shown in FIG. 7.

The output signals from the sensor arrangements S1, S2, thus the signals being applied to the output terminals of the amplifiers 50a, 50b of FIG. 3, are acquired through sampling for testing purposes, in that the circuit elements 51a, 51b are actuated, and the output terminals of amplifiers 50a, 50b are connected to the steps of the circuit arrangement which follow respectively. For the sampling time $T_A$, the relation $$T_A << \frac{1}{2\, fgo_{measuring\ signal}} \quad (8)$$

applies. Here, $fgo_{measuring\ signal}$ signifies the upper critical frequency of the measuring signal to be detected by the particular sensor arrangement. The sampling time $T_A$ lies preferably within a range of between about 1 and 50 milliseconds, in particular at 10 milliseconds.

When the acceleration values a are acquired, in practice, a resolution limit must be observed, i.e., for the smallest resolvable acceleration, it is the case that $$\hat{a}_{min\ (limit)} = 10 \cdot 10^{-3}\, g = 0.01\, g \quad (9)$$

An amplitude that can still be acquired in practice with an acceptable degree of accuracy is, for example, $$\hat{a}_{min} = 100 \cdot 10^{-3}\, g = 0.1\, g \quad (10)$$

when one starts out with an assumed error of ±1 LSB (least significant bit) in an analog-digital conversion and an acquisition error on the order of magnitude of about ±10% when acquiring $\hat{a}_{min}$. If the output signals aS1 or aS2 from the sensor arrangement S1, S2 representing the acceleration values, thus the signals being applied to the output terminals of the amplifiers 50a, 50b, are within a specifiable amplitude window, then a reference value $GW_{\frac{1}{2}}$ is formulated according to the following relation $$GW_{1/2}(iT_A) = 1/(n_{max} + 1) \sum_{k=i-n_{max}}^{k=i} a_{s1/s2}kT_A \quad (11)$$

The value $n_{max}$ should be selected so as to allow slow changes in the reference value $GW_{\frac{1}{2}}$ to be compensated by an offset drift, due for example to slow temperature changes, in the high-amplifying measuring channels of the sensor arrangements S1, S2. For example, $$n_{max} = 255 \quad (12)$$

is selected. The amplitude window is dependent in this case upon the responsivity of the accelerometers 10, 20 mounted in the sensor arrangements S1, S2.

After the reference values $GW_{\frac{1}{2}}$ are determined, it is checked whether these reference values lie within a range, which still makes it possible for acceleration changes of the expected order of magnitude to be transmitted. If this is not the case, no test of the electronic device is carried out. After certain specifiable criteria are fulfilled, for example continuance of the previously described state beyond a specifiable period of time, an error message is supplied.

Figure 5:
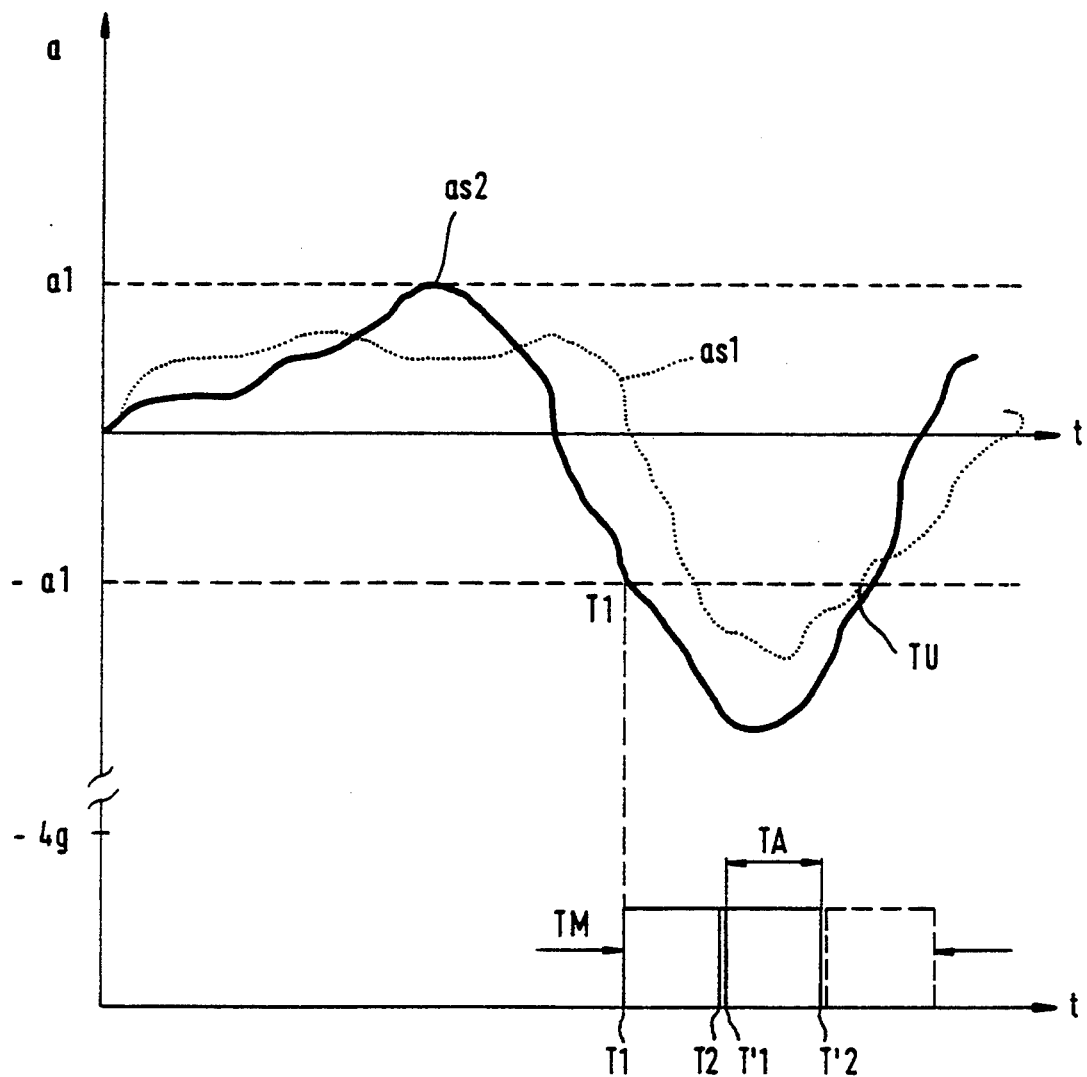
FIG. 5 illustrates, in an acceleration-time diagram, output signals from two acceleration-sensitive sensors representing accelerations.
Figure 6A:
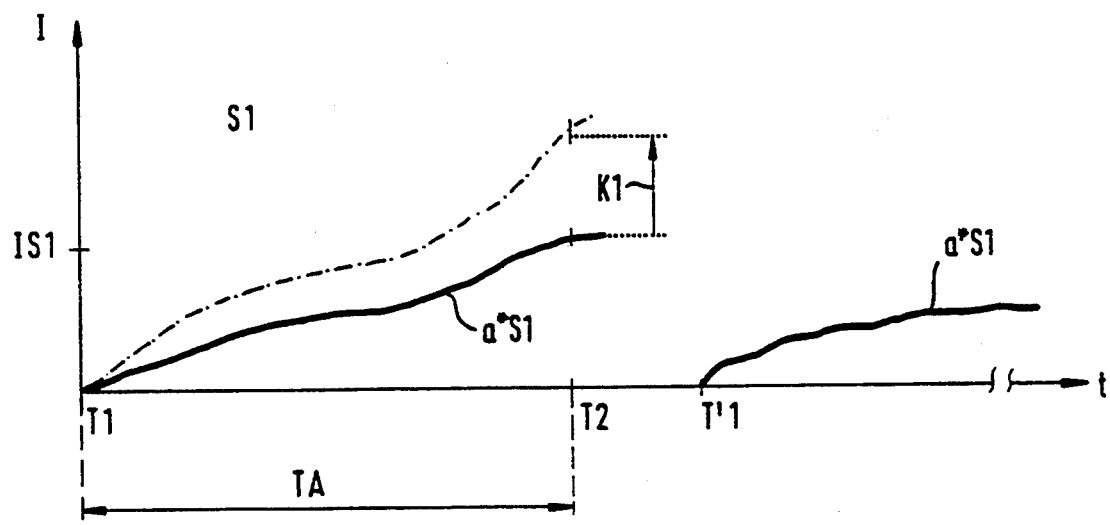
FIG. 6a and 6b depict integrated sensor output signals as a function of time.
Figure 6B:
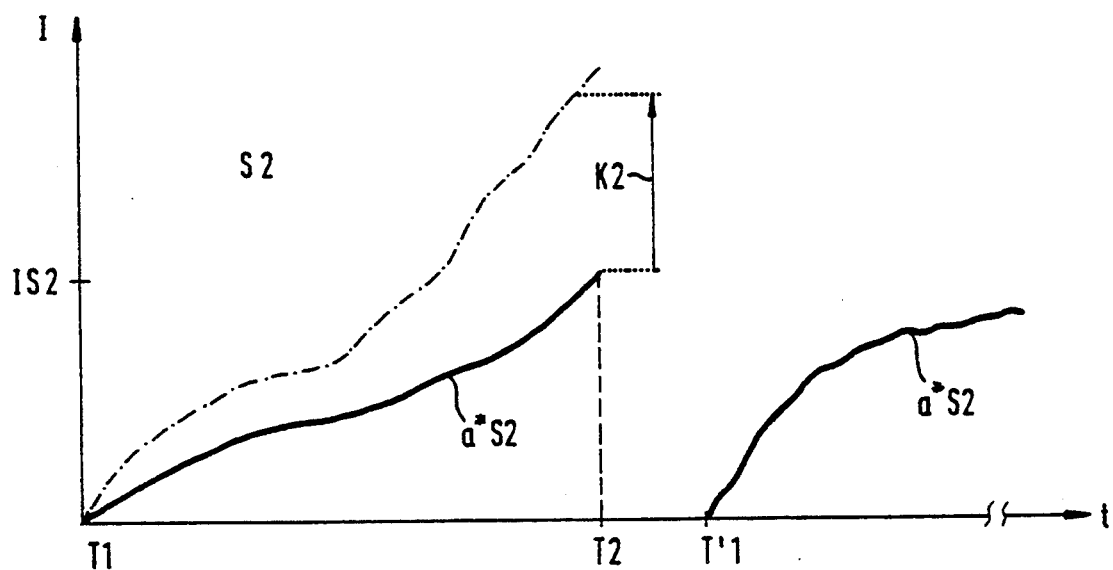

The sampling of the output signals aS1, aS2 supplied by the sensor arrangements S1, S2 is illustrated in FIG. 5. The upper part of the diagram depicted in FIG. 5 shows acceleration-time curves; in addition, a time axis is illustrated in the lower part. For as long as the acceleration signals aS1, aS2 do not exceed, in absolute value, a specifiable minimum threshold value, which is denoted in the diagram by a1, the signals are not sampled and not drawn upon for an evaluation. This is the case, for example, when there is such a negligible amount of braking and/or acceleration operations and/or switching operations during normal operation of a motor vehicle that the corresponding output signals from the accelerometers 10, 20 are covered up by the noise and can no longer be evaluated.

However, if the output signal aS1, aS2 from the sensor arrangements S1, S2 exceeds, in terms of its absolute value, the specifiable minimum threshold value a1, which lies, for example, at about 0.1 g, then an evaluation of the sensor output signals is begun. In this connection, the evaluation begins as soon as at least one signal aS1, aS2 exceeds the specifiable minimum threshold value a1 in one of the two signal channels. This is the case in FIG. 5 at the instant T1, since the signal aS2 there exceeds the specified limiting value a1 in terms of absolute value. In this instant T1, a first time window T1–T2 is opened (refer to the time axis in the lower part of the diagram according to FIG. 5), within which the signals aS1, aS2 are sampled by channels and evaluated. The evaluation comprises an integration process, which is illustrated for both channels of the sensor arrangements S1 and S2 in the diagram according to FIG. 6. In both curves depicted in FIG. 6, an integrated measurand I is generated as a function of the time t. In fact, in the upper part of the representation of FIG. 6, the integrated measurand a*S1 of the signal aS1 is generated. At the instant T2, thus at the end of the first time window or sampling interval T1–T2, this integrated measurand reaches the value IS1. The lower curve represents the integrated measurand a*S2 of the signal aS2, likewise for the time interval T1–T2. At the end of the time window, thus at the instant T2, the integrated measurand IS2 is reached. At the instant T'1, a new time window or sampling interval T'1–T'2 begins; the end point of this time window, thus the instant T'2, is no longer shown in the diagram according to FIG. 6.

The detection and evaluation of the signals aS1, aS2 takes place during a specifiable measuring period TM, which amounts to 100 to 500 milliseconds, preferably 200 to 300 milliseconds. The sampling intervals within the measuring period TM, thus the time window or time intervals T1–T2, T'1–T'2, have a duration of 5 to 50 milliseconds, preferably from 10 to 20 milliseconds. If the signals aS1, aS2 fall below the specifiable limiting values −a1, a1 during the measuring time TM, thus dip symmetrically around the T-axis again into the range of values representing the noise background, the measurement is not evaluated. Furthermore, it has proven to be expedient to arrange low-pass filters in the signal channels for processing the signals aS1, aS2. These low-pass filters are denoted in the block diagram according to FIG. 1 with reference numerals 19, 22. With the help of these low-pass filters, peak values which could possibly corrupt the measuring result, are able to be suppressed. The critical frequency of the low-pass filter 19, 22 lies preferably between about 30 to 40 Hz.

In the following, it is shown with reference to FIG. 8–FIG. 12 that in the case of accelerometers or sensor arrangements, the influence of the lower critical frequency fgu can be compensated for up to its tolerance, provided that the resolution of the measuring signal is able to be enhanced to the extent that is required for the measuring values. In real systems, there are limitations on the enhancement of resolution, since it is not possible for a measuring time TM, of any desired length, to eliminate the influence of the lower critical frequency fgu independently of the signal to be measured. For further clarification, reference is first made to FIG. 8, in whose upper part a sensor arrangement S is shown, which is fed an acceleration signal a(t) on the input side and supplies an acceleration-dependent output signal b(t) on the output side. Assuming that the sensor arrangement has a lower critical frequency fgu, an upper critical frequency fgo, it is the case that:

$$fgo >> fgu \text{ and} \quad (13)$$

$$fgu = \frac{1}{2 \pi \tau}. \quad (14)$$

E denotes the responsivity of the sensor arrangement S. Commercial sensors have a responsivity of, for example, $$E = 100 \frac{mV}{g}. \quad (15)$$

Figure 8:
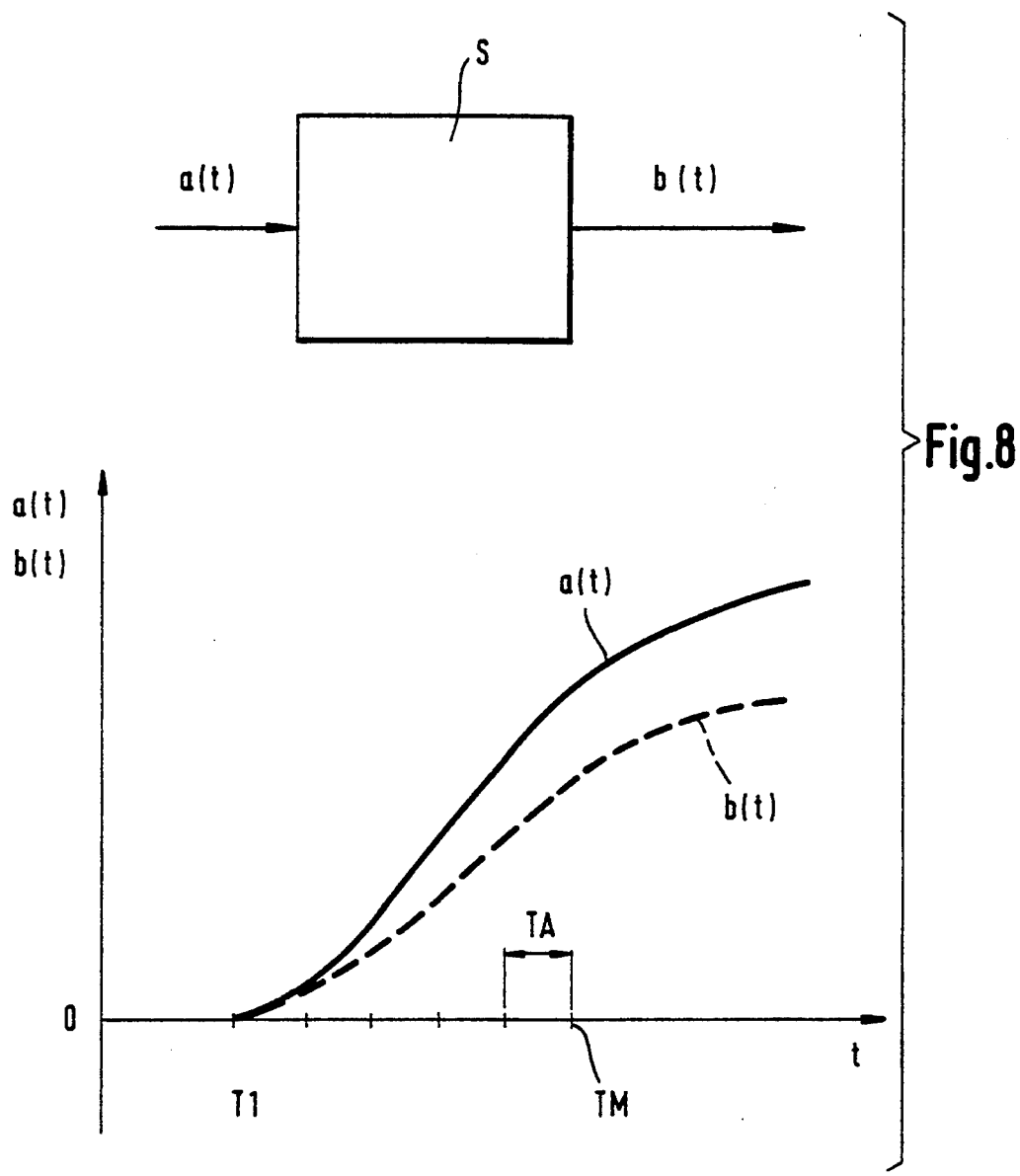
FIG. 8 shows a diagram of the deviation of the sensor output signal from the acceleration signal.

Characteristic curve shapes of the signals a, b are depicted illustratively as a function of time in the lower part of FIG. 8. At this point, if $â_{min}$ is the smallest amplitude of the measuring signal that can be acquired with an error that is still tolerable, and one selects $$|b(t)|dt \geq E \cdot â_{min}, \quad (16)$$

then the uncorrupted integral of the measuring signal a(t) is able to be recovered from the signal b(t) that had been corrupted by the lower critical frequency of the sensor S.

One obtains the ideal measuring value $MW_i$ $$MW_i = \int_{T1}^{T1 + TM} a(t) \, dt \quad (17)$$

by applying a mathematical rule V to the signal b(t), i.e., it applies that $$MW_i = V[b(t)], \quad (18)$$

if the relation (16) is fulfilled and if it applies, furthermore, that $$t \in [T1, T1+TM] \quad (19)$$

Figure 9:
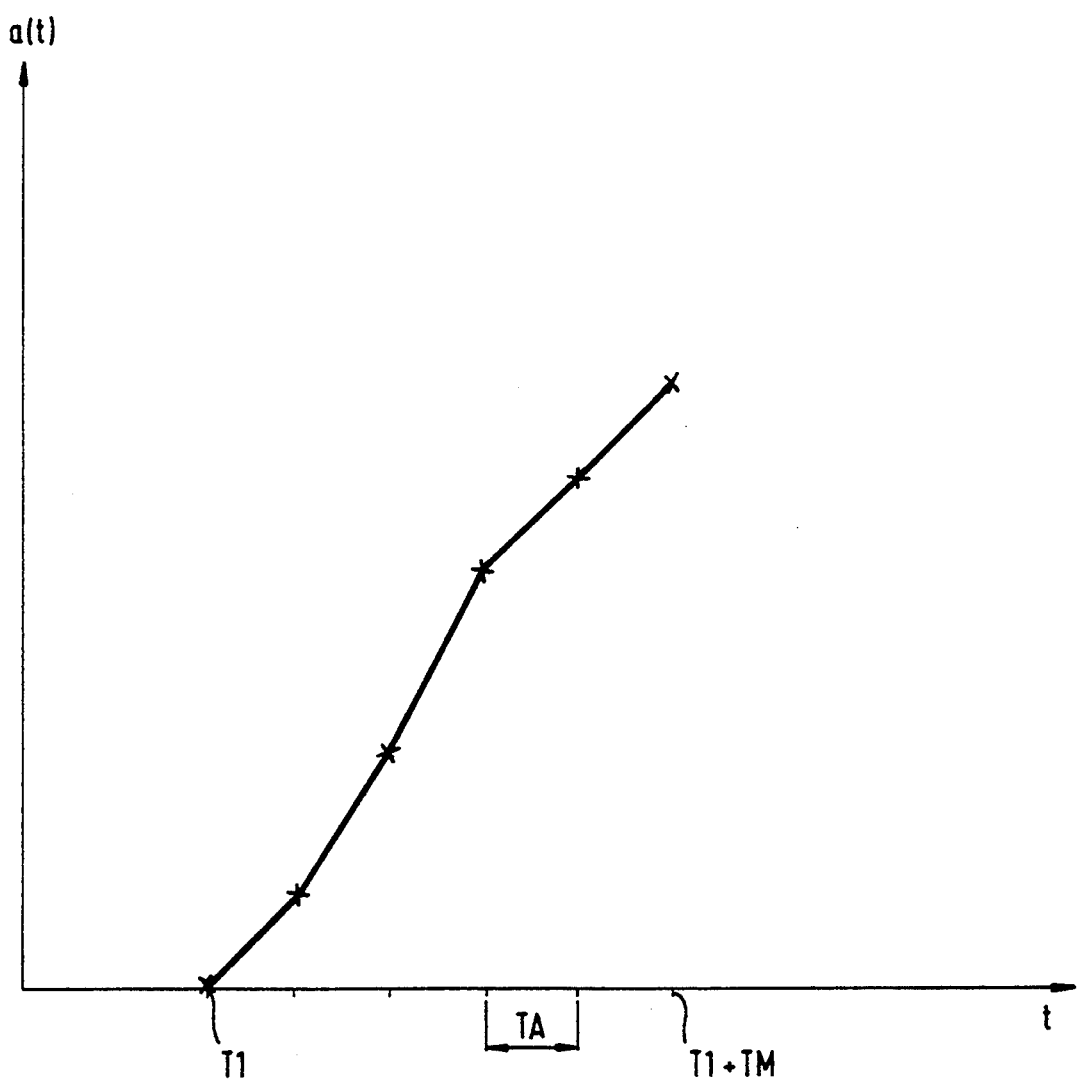
FIG. 9 through FIG. 12 show acceleration-time diagrams, illustrating how the true acceleration is approximately represented by a sensor output signal.
Figure 10:
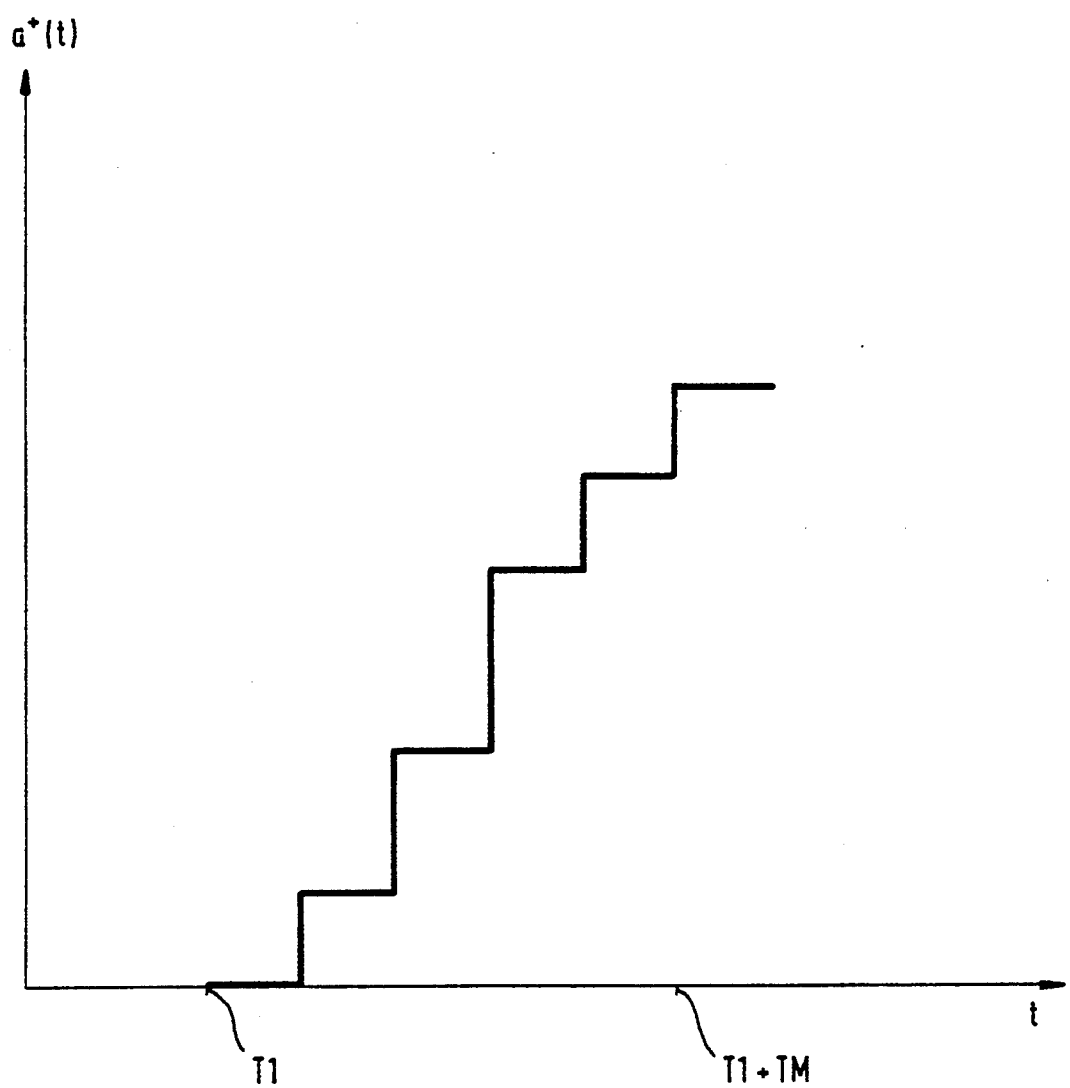

In the ideal case, the measuring signal in accordance with FIG. 9 would be able to be determined through direct sampling, if the measuring signal did not show a frequency higher than the upper critical frequency fgo and if one selected the sampling time in accordance with the relation (8):

$$T_A << \frac{1}{2 \, fgo_{measuring \, signal}}. \quad (8)$$

Figure 11:
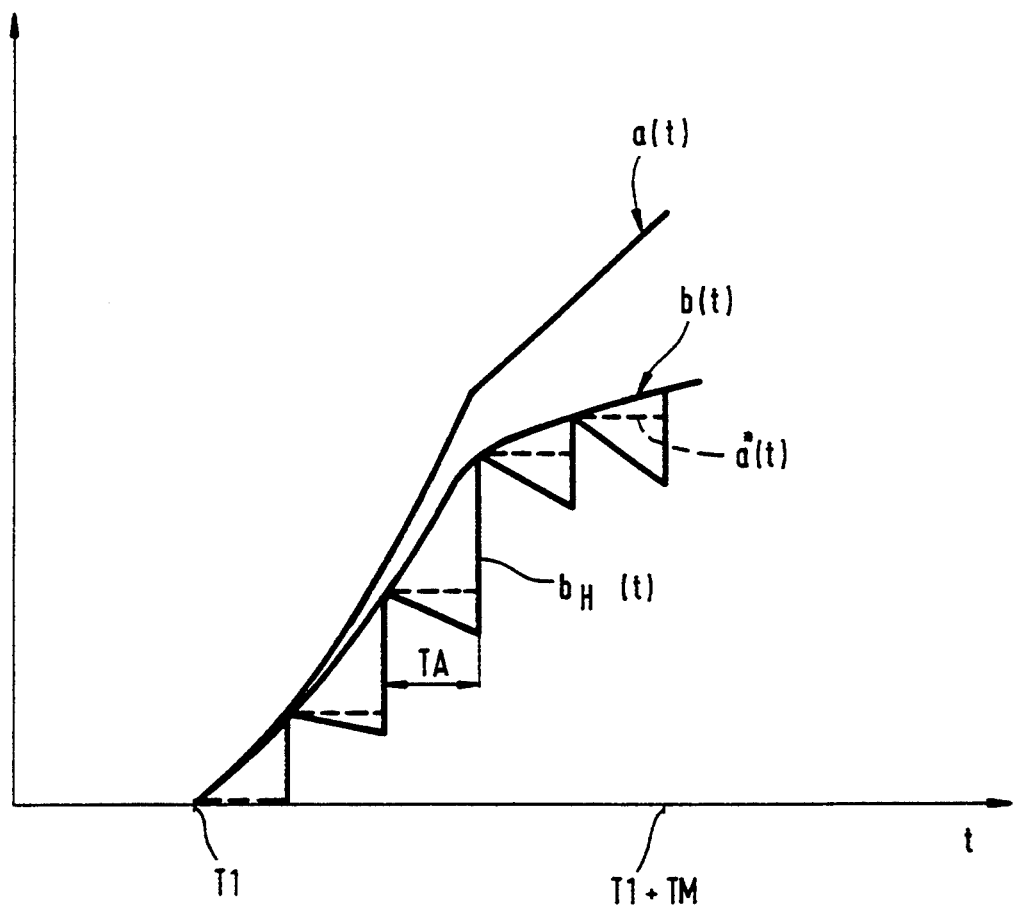

In FIG. 9, T1 denotes the beginning of the measurement and T1+TM the end point of the measurement. TM is the total measuring period, while the sampling time is denoted by TA. From the sampling values shown in FIG. 9, the ideal step (staircase) function $a^+(t)$ depicted in FIG. 10 results. It comes quite close to reproducing the acceleration signal a(t) on the basis of the sampling theorem. At this point, if the signal $a^+(t)$ is supplied to a sensor S having the filter characteristic of a band-pass (lower critical frequency fgu, upper critical frequency fgo), in which case $$fgo_{measuring \, signal} << fgo, \quad (20)$$

then the step changes in the function $a^+(t)$ are represented nearly ideally by the sensor S in the considered time scale. Since, however, it is the case that $$fgu_{measuring \, signal} < fgo, \quad (21)$$

the step height diminishes substantially within the sampling times TA, as is apparent from FIG. 11. In FIG. 11, the following denote:

a(t): measuring signal;
b(t): sensor output signal;
$a^+(t)$: step function acquired by sampling in the interval TA of the sensor output signal;
$b^H(t)$: auxiliary function for producing b(t).
b(t) is the output signal from the sensor when the step function $a^+(t)$ acts as an input signal.

If the band-pass characteristic of the sensor S is able to be described in the range of its lower critical frequency fgu by a first-order filter, then it applies that:

$$U_{sp}(t) = E \cdot a \cdot e^{-t/\tau}, \quad (22)$$
for
$$a(t) = a \cdot s(t), \quad (23)$$
and $$s(t) = \begin{matrix} 1, t \geq 0 \\ 0, t < 0 \end{matrix}, \quad (24)$$

in which case $$\tau = \frac{1}{2 \, fgu}. \quad (25)$$

Therein, E=responsivity of the sensor and a=step height of the measuring signal.

Figure 12:
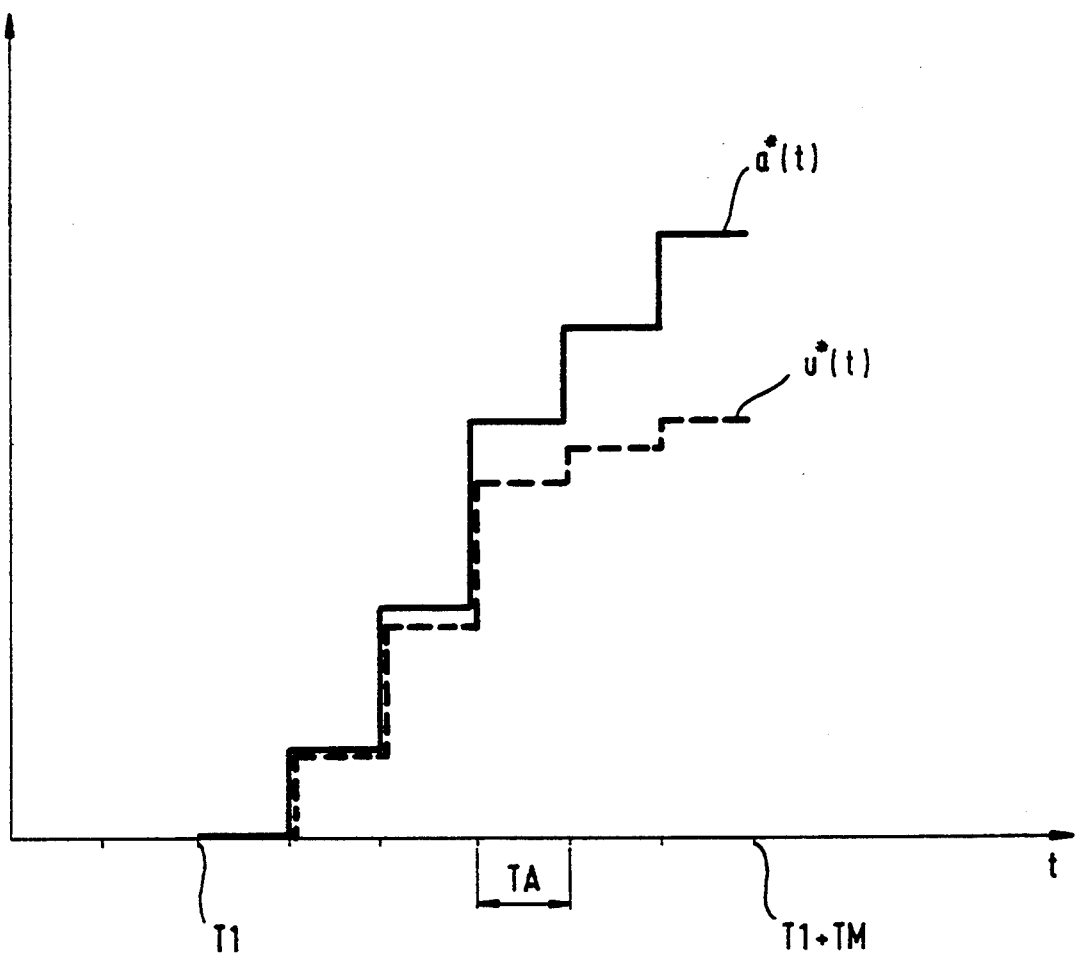

Based on the knowledge of this step response (or in some instances, any other type of response to a step change in the case of higher order filters), the sensor signal b(t) is able to be calculated from the step function $a^+(t)$ of the sampled measuring signal. As the depiction of these functions in FIG. 12 shows, the sampled sensor signals deviates considerably from the sampled original signal, already at the end of the measuring period TM. The result is that the measuring periods TM must not be selected to be so large.

For purposes of simplification, in the following T1=0; in addition the following abbreviations are introduced:

$$\begin{aligned} b^+(0) &= b^+0 & a^+(0) &= a^+0 \\ b^+(TA) &= b^+1 & a^+(TA) &= a^+1 \\ b^+(2TA) &= b^+2 & a^+(2TA) &= a^+2 \\ &\cdot & &\cdot \\ &\cdot & &\cdot \\ &\cdot & &\cdot \\ b^+(nTA) &= b^+2 & a^+(2TA) &= a^+n. \end{aligned} \quad (26)$$

By consistently applying the relation (22), for the function $a^+(t)$ one obtains:

$$b^+(0) = E \cdot a^+0 = 0 \quad (27)$$
$$b^+1 = E \cdot a^+1 \quad (28)$$
$$b^+2 = E \cdot [(a^+2 - a^+1 \, (1 - e^{-TA/\tau})] \quad (29)$$
$$b^+3 = E \cdot [(a^+3 - (a^+2 - a^+1)(1 - e^{-TA/\tau}) - \quad (30)$$
$$a^+1 \, (1 - e^{-2TA/\tau})] \ldots$$
$$b^+n = E \cdot [(a^+n - (a^+n - 1) - \quad (31)$$
$$(a^+n - 2])(1 - e^{-TA/\tau})] -$$
$$[(a^+n - 2) - (a^+n - 3)(1 - e^{-2TA/\tau}) - \ldots -$$
$$a^+1 \, (1 - e^{-(n-1)TA/\tau})].$$

In the case of an integral evaluation, it applies that:

$$a(t) = \sum_{n=0}^{n=\frac{TM}{TA}} a^+n \cdot s(t - n \cdot TA), \quad (32)$$

$$b(t) = \sum_{n=0}^{n=\frac{TM}{TA}} b^+n \cdot s(t - n \cdot TA). \quad (33)$$

When the Simpson rule (n, even) is applied, then:

$$MW_i = \int_{T=T1}^{T1+TM} a(t) \, dt \, \frac{TA}{3} \, (a^+0 + 4a^+1 + \quad (34)$$
$$2a^+2 + 4a^+3 + \ldots + 2a^+n - 2 + 4a^+n - 1 + a^+n)$$

Applying equations (32) and (33), it follows from (34):

$$MW_i = \quad (35)$$
$$\frac{1}{E} \, \frac{TA}{3} \, [b^+0 + 4b^+1 + 2(b^+2 + b^+1(1 - e^{-\frac{TA}{\tau}})) + \ldots +$$
$$[b^+n + b^+n - 1(1 - e^{-\frac{TA}{\tau}}) + b^+n - 2(1 - e^{-\frac{TA}{\tau}}) +$$

-continued $$\ldots b^+1(1-e^{-\frac{TA}{\tau}})].$$

Thus, with equation (35), the rule V is given, which makes it possible, through the sampling of the sensor output signal b(t), in spite of a limited lower critical frequency fgo of the sensor s, to correctly acquire slow physical measuring signals (whereby $fgo_{meas}<fgo$), for as long as the signal values to be acquired are not too heavily corrupted by the finite resolution capability of the measuring channel. Since besides the particular sampling values of the sensor output signal $b^+(t)$ in equation (35), only constants occur, which must first be established, this relation is particularly advantageous for comparatively simple microprocessor systems, as are used in control units. For example, the solution proposed according to the invention makes it possible to still acquire braking operations, which are associated with acceleration changes in the order of magnitude of about 0.5 g per 300 milliseconds, using an acceleration sensor of an airbag system, which has a time constant of about 250 milliseconds.

The decay factors AF1 for the sensor arrangement S1 and AF2 for the sensor arrangement S2 specified in the following equations (36) and (37) are among the terms to be redetermined only once and then to be stored:

$$AF1 = 1 - e^{-\frac{TA}{\tau 1}} \qquad (36)$$

$$AF2 = 1 - e^{-\frac{TA}{\tau 2}} \qquad (37)$$

TA is the sampling time already mentioned several times. E stands generally for the responsivity of a sensor S. For the sensor arrangement S1, the value E1 is to be set in place of E and, accordingly, for the sensor arrangement S2, the value E2.

The responsivities E1, E2 of the sensor arrangements S1, S2 are functions of the temperature $\theta$ and are able to be represented, in accordance with the following relations (38), (39), as a corresponding expansion in series:

$$E1 = E1(\theta) = e^12\theta^2 + e^11\theta + e^1o \qquad (38)$$

$$E1 = E2(\theta) = e^22\theta^2 + e^22\theta + e^2o \qquad (39)$$

The variables 1 and 2 appearing in the exponents of the decay factors AF1, AF2 in accordance with (36) and (37) are dependent upon temperature, as well, and are able to be represented accordingly as an expansion in series:

$$1 = 1(\theta) = f^12.\theta^2 + f^11.\theta + f^1O \qquad (40)$$

$$2 = 2(\theta) = f^22.\theta^2 + f^21.\theta + f^2O \qquad (41)$$

In an especially expedient manner, the temperature dependence of the above-mentioned variables is already taken into consideration when the electronic unit is manufactured in that the electronic unit, in particular its sensor arrangements S1, S2 (compare, in particular, FIG. 2 and FIG. 3) are subjected to different ambient temperatures for testing purposes. At least three temperature values RT, HT and TT are expediently adjusted, RT corresponding in this case to the average room temperature and HT as well as TT representing extremely high or low temperature values that the electronic unit is subjected to during its application in a motor vehicle.

In accordance with FIG. 2 and FIG. 3, the electronic unit comprises a temperature sensor 59, which acquires these test temperatures and generates a corresponding output signal, which then, as is apparent, for example, from FIG. 2, is also converted by an A/D converter A/D-5 into a digital signal. An interpolation polynomial of the second order, for instance, is expediently determined from the testing temperatures with the help of an external computer. Its constants are filed in a storage area of the unit's own processor 12, thus for example in the storage unit 15 of the processor 12 in FIG. 2. In normal operation, the electronic unit then falls back upon these stored values in accordance with the ambient temperature established at the time by the temperature sensor 59, to be able to implement temperature-dependent corrections.

The time constants $\tau 1$, $\tau 2$ of the lower critical frequencies fgu of the sensor arrangements S1, S2 that occur in the decay factors AF1, AF2 in accordance with equations (36) and (37) are expediently determined as follows. When the electronic unit is manufactured, two different test signals, whose shape exhibits an abrupt change, are supplied to the sensor arrangements S1, S2 (compare the exemplified embodiment according to FIG. via test lines test1, test2, in each case at two different measuring instants. The output voltages arising at the output terminals of the sensor arrangements S1, S2 are supplied via amplifiers 11', 21' to A/D converters A/D-3 and A/D-4 and converted into digital signals. These measurements are likewise carried out for at least three different ambient temperatures RT, HT and TT. The sensor arrangements S1, S2 respond to the test signals test1, test2 with an output signal, which has the shape of a decaying e-function. The time constants $\tau 1$, $\tau 2$ are able to be determined from this e-function. As already mentioned, these time constants are determined for three different temperature values. An interpolation polynomial, preferably maximally of a second order, can then be determined from these variables, in turn, with the aid of a computer, if applicable an external computer (c.f. equations (36) and (37)). The constants of these interpolation polynomials are then stored, in turn, in the storage unit 15 of the processor 12.

The correction factors acquired in the previously described manner are drawn upon in the normal operating mode of the electronic unit to implement a correction of the sensor output signals. This is illustrated by the schematic depiction of FIG. 6. It was explained above that the sensor output signals aS1, aS2 are integrated so that the signals a*S1 and a*S2 result. One obtains a corrected signal pattern from these integration values, for example, in that correction values K1 are additionally applied to the signal a*S1 or K2 to the signal a*S2 at the instant T2, thus at the end of a sampling interval TA. By applying the measured values MWi corrected in this manner, thus in the case of the two sensor arrangements S1, S2 by applying the measured values MW1 and MW2, a subtraction operation is then performed in accordance with the following relation (42)

$$D = |MW1 - MW2| \qquad (42)$$

to obtain the differential value D. It is subsequently queried, compare equation (43), $$D = |MW1 - MW2| \leq F \tag{43}$$

whether this differential value D lies below a specifiable setpoint value F. If it does lie below such a value, a proper functioning of the sensor arrangements S1, S2 is inferred; in the other case, an error message is produced.

The entire test sequence of the sensor arrangements S1 and S2 will be clarified briefly once more on the basis of the flow chart of FIG. 7. Step 100 starts the test and specifies, if indicated, minimum acceleration values −a1, a1, which must be exceeded for there to be an evaluation. In step 200, the output signals aS1 and aS2 from the sensor arrangements S1 and S2 are detected. It is checked in step 300, whether at least one of the output signals aS1, aS2 from the sensor arrangements S1, S2 exceeds, in terms of absolute value, the specifiable minimum value a1 of acceleration. If this is the case, a time window, for example the time window T1–T2, is opened in step 400, and the output signal from the sensor arrangement S1, S2 is detected during a sampling time. The integrated measurands I of the sensor output signals, thus I s1 and I s2 are generated in a step 400. The time window is closed in step 600. In step 700, the determined integrated measurands I s1 and I s2 are combined with the correction values K1, K2. The thus corrected integrated measurands then undergo a subtraction operation in a step 800, to obtain the differential value D. It is subsequently determined in a step 900, whether the determined differential value D lies below a specifiable setpoint value F. Should this be the case, it is confirmed in a step 1000 that the sensor arrangements S1, S2 are in order. Should the differential value D be greater than the specifiable setpoint value F, then an error message is prompted in step 2000 indicating that the sensor arrangements S1, S2 are defective.

The described method renders possible a high-quality monitoring of an electronic device comprising two sensor arrangements S1, S2. Such monitoring is also carried out by evaluating comparatively slow control processes, as represented by ordinary braking operations in road traffic. The method also makes it possible to immediately detect, for example, too large deviations in responsivity among the sensor channels. In this manner, an exceptional level of operational reliability is achieved for the electronic device, since the sensors that previously were only able to be tested with difficulty are now subject to an ongoing control.

What is claimed is:

1. A method for testing an electronic device having a first acceleration-sensitive sensor arrangement that generates a first acceleration signal and a second acceleration-sensitive sensor arrangement that generates a second acceleration signal, comprising the steps of:
   a) determining whether at least one of the first and second acceleration signals exceeds a preselected minimum absolute acceleration value;
   b) if the minimum absolute acceleration value is exceeded by at least one of the first and second acceleration signals, sampling the first and second acceleration signals for a preselected number of sampling periods within a predetermined time interval to generate a plurality of first sample values from the first acceleration signal and a plurality of second sample values from the second acceleration signal;
   c) applying a first compensation factor to each of the plurality of first sample values and a second compensation factor to each of the plurality of second sample values;
   d) summing the compensated first sample values to generate a first evaluation signal and summing the compensated second sample values to generate a second evaluation signal;
   e) determining a difference between the first evaluation signal and the second evaluation signal; and
   f) determining whether the difference between the first and second evaluation signals exceeds a specified threshold value.

2. The method according to claim 1, further comprising the step of applying a first correction factor to the first evaluation signal to generate a corrected first evaluation signal and applying a second correction factor to the second evaluation signal to generate a corrected second evaluation signal, and wherein the difference is determined as a function of the corrected first evaluation signal and the corrected second evaluation signal.

3. The method according to claim 2, wherein the first correction factor and the second correction factor are constant values.

4. The method according to claim 2, wherein the first correction factor and the second correction factor are variable values, the variable values being functions of a set of operating parameters.

5. The method according to claim 4, wherein one of the operating parameters is an ambient temperature.

6. The method according to claim 2, wherein the first correction factor and the second correction factor are stored in a table.

7. The method according to claim 2, wherein the first correction factor and the second correction factor are stored in an engine characteristics map.

8. The method according to claim 1, wherein the predetermined time interval is in a range of 100 to 500 milliseconds.

9. The method according to claim 1, wherein the predetermined time interval is in a range of 200 to 300 milliseconds.

10. The method according to claim 1, wherein each of the sampling periods is in a range of 5 to 50 milliseconds.

11. The method according to claim 1, wherein each of the sampling periods is in a range of 10 to 20 milliseconds.

12. The method according to claim 2, wherein the first and second correction factors compensate for fluctuations of the first and second acceleration signals as a function of a set of critical frequencies corresponding to the first and second acceleration-sensitive sensor arrangements.

13. The method according to claim 12, wherein the first and second correction factors are determined as a function of a plurality of measured values of the first and second acceleration signals measured during a test run of the electronic device.

14. The method according to claim 13, wherein one of the plurality of measured values is a responsivity of the sensor arrangements to temperature.

15. The method according to claim 13, wherein during the test run the electronic device is exposed to at least three different temperature values, including a room temperature value and two extreme critical temperature values to which the electronic device is exposed during its application in the motor vehicle.

16. The method according to claim 13, wherein an interpolation polynomial of the second order is calculated from the measured values determined during the test run, a set of constants for the terms of the interpolation polynomial stored as a table in a storage unit of the electronic device.

17. The method according to claim 13, wherein an interpolation polynomial of the second order is calculated from the measured values determined during the test run, a set of constants for the terms of the interpolation polynomial stored as an engine characteristics map in a storage unit of the electronic device.

18. The method according to claim 1, further comprising the step of filtering each of the first and second acceleration signals via a low-pass filter.

19. The method according to claim 18, wherein each low-pass filter has a critical frequency in a range of 30 to 40 Hz.

20. In an electronic device having an acceleration-sensitive sensor arrangement for generating acceleration signals, a method for testing the electronic device comprising the steps of:
   a) specifying a minimum absolute acceleration value;
   b) detecting an output signal from the acceleration-sensitive sensor arrangement;
   c) testing whether the output signal from the acceleration-sensitive sensor arrangement exceeds the minimum absolute acceleration value;
   d) if the minimum absolute acceleration value is exceeded by the output signal, sampling the output signal for a selected number of sampling periods within a time interval of predetermined duration to generate a plurality of sample values;
   e) applying a compensation factor to each of the plurality of sample values;
   f) summing the compensated sample values to generate a first evaluation signal; and
   g) determining an operating state of the electronic device as a function of the first evaluation signal.

21. The method according to claim 20, further comprising the step of applying a correction factor to the first evaluation signal to generate a corrected evaluation signal, and wherein the operating state is determined as a function of the corrected evaluation signal.

22. The method according to claim 21, wherein the sample values are compensated and summed only when the sample values exceed the minimum absolute acceleration value.

23. An electronic device for vehicle operation safety, comprising:

a first acceleration-sensitive sensor for generating a first acceleration signal;
   a second acceleration-sensitive sensor for generating a second acceleration signal;
   a detection circuit coupled to the first and second sensors for detecting the first and second acceleration signals;
   a timing circuit coupled to the first and second sensors for sampling the first and second acceleration signals for a preselected number of sampling periods within a predetermined time interval to generate a plurality of first sample values from the first sensor and a plurality of second sample values from the second sensor;
   a compensation circuit coupled to the timing circuit for applying a first compensation factor to the plurality of first sample values and applying a second compensation factor to the plurality of second sample values;
   a summing circuit coupled to the compensation circuit for summing the compensated first sample values to generate a first evaluation signal and summing the compensated second values to generate a second evaluation signal; and
   a comparator coupled to the summing circuit for determining an operating state of the electronic device as a function of a difference between the first evaluation signal and the second evaluation signal and for providing a signal based thereon.

24. The device according to claim 23, further comprising a correction circuit coupled to the summing circuit for applying a first correction factor to the first evaluation signal and a second correction factor to the second evaluation signal, wherein the comparator determines the difference between the corrected first evaluation signal and the corrected second evaluation signal, and further comprising a storage unit coupled to the correction circuit in which the correction factors are stored.

25. The device according to claim 23, further comprising a warning device coupled to the comparator for generating a warning signal when the difference exceeds a predetermined value.

26. The device according to claim 23, further comprising a temperature sensor for measuring an ambient temperature to which the electronic device is exposed during its operation.

27. The device according to claim 23, further comprising a plurality of low-pass filters coupled to the acceleration-sensitive sensors for filtering the acceleration signals.

* * * * *

UNITED STATES PATENT AND TRADEMARK OFFICE
CERTIFICATE OF CORRECTION

Page 1 of 2

PATENT NO. : 5,440,913
DATED : August 15, 1995
INVENTOR(S) : Norbert Cripspin, et. al.

It is certified that error appears in the above-indentified patent and that said Letters Patent is hereby corrected as shown below:

| Column | Line | |
|---|---|---|
| 3 | 68 | Change " $\pi 1 = R1...$" to -- $\tau 1 = R1...$--. |
| 4 | 4 | Change " $\pi 2 = R2...$" to -- $\tau 2 = R2...$--. |
| 5 | 40 | Change "symbol "as" denotes" to --symbol "$as$" denotes--. |
| 5 | 50 | Change "0.9 as" to --0.9 $as$--. |
| 8 | 56 | Change "a, b" to --$a, b$--. |
| 9 | 44 | Change "$fgu_{measuring\ signal} < fgo,$" to --$fgu_{measuring\ signal} \leq fgo,$--. |
| 9 | 63 | Change "$a(t) = a \cdot s(t),$" to --$a(t) = \hat{a} \cdot s(t),$--. |
| 10 | 6 | Change "a=step" to --$\hat{a}$=step--. |

UNITED STATES PATENT AND TRADEMARK OFFICE
CERTIFICATE OF CORRECTION

PATENT NO. : 5,440,913
DATED : August 15, 1995
INVENTOR(S) : Norbert Crispin, et. al.

It is certified that error appears in the above-indentified patent and that said Letters Patent is hereby corrected as shown below:

| Column | Line | |
|---|---|---|
| 10 | 30 | Change "$b+2$" to --$b+n$--. |
| 12 | 27 | Change "FIG. via" to --FIG. 2) via--. |
| 12 | 65 | Change "$D = \mid MW1 - MW2 \mid$" to --$D = \mid \mid MW1 \mid - \mid MW2 \mid \mid$--. |
| 13 | 2 | Change "$D = \mid MW1 - MW2 \mid$" to --$D = \mid \mid MW1 \mid - \mid MW2 \mid \mid$--. |

Signed and Sealed this

Nineteenth Day of November, 1996

Attest:

BRUCE LEHMAN

*Attesting Officer*        *Commissioner of Patents and Trademarks*